US006301426B1

(12) United States Patent
Jameson et al.

(10) Patent No.: US 6,301,426 B1
(45) Date of Patent: *Oct. 9, 2001

(54) MECHANICALLY ADJUSTABLE FIBER OPTIC ATTENUATOR AND METHOD EMPLOYING SAME

(75) Inventors: Gary O. Jameson, Saratoga Springs, NY (US); Kevin J. McCallion, Boston, MA (US)

(73) Assignee: Molecular OptoElectronics Corporation, Watervliet, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,566

(22) Filed: Mar. 16, 1999

(51) Int. Cl.$^7$ ................. G02B 6/00; G02B 6/26
(52) U.S. Cl. ............................... 385/140; 385/32
(58) Field of Search .................. 385/140, 32, 33, 385/27, 28, 30, 37, 39, 141

(56) References Cited

U.S. PATENT DOCUMENTS

| 4,060,308 | 11/1977 | Barnoski et al. | 350/96 C |
|---|---|---|---|
| 4,201,446 | 5/1980 | Geddes et al | 350/96.29 |
| 4,270,839 | * 6/1981 | Cross | 385/32 |
| 4,343,532 | 8/1982 | Palmer | 350/96.19 |
| 4,387,954 | 6/1983 | Beasley | 350/96.15 |
| 4,469,544 | 9/1984 | Goodman | 156/345 |
| 4,469,554 | 9/1984 | Turner | 156/657 |
| 4,630,884 | 12/1986 | Jubinski | 350/96.15 |
| 4,630,890 | 12/1986 | Ashkin et al. | 350/96.3 |
| 4,704,151 | 11/1987 | Keck | 65/4.1 |
| 4,712,866 | 12/1987 | Dyott | 350/96.19 |
| 4,753,497 | 6/1988 | Fujii et al. | 350/96.15 |
| 4,773,924 | 9/1988 | Berkey | 65/3.11 |
| 4,778,237 | 10/1988 | Sorin et al. | 350/96.15 |
| 4,786,130 | 11/1988 | Georgiou et al. | 350/96.15 |

(List continued on next page.)

FOREIGN PATENT DOCUMENTS

| 4005557 A1 | 8/1991 | (DE) . | |
|---|---|---|---|
| 4343943 A1 | 6/1995 | (DE) . | |
| 0229456 A2 | 7/1987 | (EP) . | |
| 0488266 A2 | 6/1992 | (EP) . | |
| 2184859A | 7/1987 | (GB) . | |
| 2190211A | 11/1987 | (GB) . | |
| 60-203904 | 10/1985 | (JP) . | |
| 06-114713 | 4/1994 | (JP) . | |
| DD 294803 | * 10/1991 | (NL) | 385/140 |
| WO 87/03676 | 6/1987 | (WO) | G01D/5/26 |
| WO 89/01170 | 2/1989 | (WO) . | |
| WO 95/05617 | 2/1995 | (WO) . | |

OTHER PUBLICATIONS

Bergh, R.A. et al., "Single–Mode Fibre Optic Directional Coupler," *Electronic Letters* 16(7), pp. 260–261 (1980).

Brophy, Timothy J. et al., "Formation and Measurement of Tapers in Optical Fibers," *Rev. Sci. Instrum.* 64 (9), pp. 2650–2654 (1993).

Carrara, S.L.A. et al., "Elasto–optic Alignment of Birefringent Axes in Polarization–Holding Optical Fiber," *Optics Letters* 11(7), pp.470–472 (1986).

(List continued on next page.)

*Primary Examiner*—Cassandra Spyrou
*Assistant Examiner*—Euncha Cherry
(74) *Attorney, Agent, or Firm*—Heslin Rothenberg Farley & Mesiti P.C.; Kevin P. Radigan, Esq.

(57) ABSTRACT

Mechanically adjustable fiber optic attenuators and attenuation systems are disclosed for adjustably extracting optical energy from a fiber optic, and therefore attenuating the optical signal being transmitted through the fiber optic. In one aspect, material is removed from a portion of the fiber optic, thereby exposing a surface through which optical energy can be extracted. A cylindrical-shaped preform is selectively positioned into and out of engagement, e.g., physical contact, with the interaction surface of the side-polished fiber for adjustably extracting the optical energy.

36 Claims, 5 Drawing Sheets

U.S. PATENT DOCUMENTS

| | | | |
|---|---|---|---|
| 5,060,307 | | 10/1991 | El-Sherif .............................. 359/173 |
| 5,078,465 | | 1/1992 | Dahlgren ................................ 385/50 |
| 5,091,894 | | 2/1992 | Kobayashi et al. .................... 385/16 |
| 5,106,394 | | 4/1992 | Bramson ................................ 51/309 |
| 5,108,200 | | 4/1992 | Nonaka et al. ........................ 385/16 |
| 5,127,084 | * | 6/1992 | Takahashi ............................ 385/140 |
| 5,135,555 | | 8/1992 | Coyle, Jr. et al. ........................ 65/12 |
| 5,136,818 | | 8/1992 | Bramson ........................... 51/165.72 |
| 5,265,178 | | 11/1993 | Braun et al. ............................ 385/24 |
| 5,290,398 | | 3/1994 | Feldman et al. ...................... 156/651 |
| 5,351,319 | | 9/1994 | Ginder et al. ............................ 385/6 |
| 5,444,723 | * | 8/1995 | Chandonnet et al. ............... 385/140 |
| 5,493,629 | | 2/1996 | Stange ................................. 385/125 |
| 5,623,567 | | 4/1997 | Barberio et al. ........................ 385/30 |
| 5,673,351 | | 9/1997 | Clarke et al. ......................... 385/100 |
| 5,781,675 | | 7/1998 | Tseng et al. ............................ 385/30 |
| 5,853,969 | | 12/1998 | Harada et al. ........................ 430/510 |
| 5,966,493 | | 10/1999 | Wagoner et al. ..................... 350/140 |
| 6,011,881 | | 1/2000 | Moslehi et al. ......................... 385/10 |
| 6,144,794 | * | 11/2000 | Mao et al. ............................ 385/140 |

OTHER PUBLICATIONS

McCallion, Kevin J. and Shimazu, Michael, "Side–Polished Fiber Provides Functionality and Transparency," *Optoelectronics World*, pp. S19–S24, (1998).

Todd, David A. et al., "Polarization–splitting Polished Fiber Optic Couplers," *Optical Engineering* 32(9), pp. 2077–2082 (1993).

Birks, Timothy A. and Li, Youwei W., "The Shape of Fiber Tapers," *IEEE Journal of Lightwave Technology* 10 (4), pp. 432–438 (Apr. 4,1992).

Cordaro, M.H. et al., "Precision Fabrication of D–Shaped Single–Mode Optical Fibers by In Situ Monitoring," *IEEE Journal of Lightwave Technology*, vol. 12, No. 9, pp. 1524–1531 (1994).

Diez A. et al., "Cynlindrical Metal–Coated Optical Fibre Devices for Filters and Sensors," *Electronic Letters* 32(15), pp. 1390–1392 (Jul. 18, 1996).

Gowar, J., *Optical Communication Systems*, Ch.3, 58–77 (2d Ed. 1993).

Hussey, C.D. and Minelly, J.D., "Optically Fibre Polishing with a Motor–Driven Polishing Wheel," *Electronic Letters* 24, p. 805 (1988).

Kenny, R.P. et al., "Control of Optical Fibre Taper Shape," *Electronic Letters* 27 (18), pp. 1654–1656 (Aug. 28, 1991).

Love, J.D. et al., "Quantifying Loss Minimisation in Single–Mode Fibre Tapers," *Electronic Letters* 22(17) pp. 912–914 (Aug. 14, 1986).

Morozov Val et al., "Fused Fiber Optic Variable Attenuator, " *OFC 2000, $25^{th}$ Annual Optical Fiber Comminications Conference*, pp. 22–24 (Mar. 10, 2000).

Mueller–Westerhoff, Ulrich T. et al., "The Synthesis of Dithiolene Dyes with Strong Near–IR Absorption," *Tetrahedron* 47, pp. 909–932 (1991).

Leminger, Ottokar G. and Zengerle, Remigius, "Determination of Single–Mode Fiber Coupler Design Parameters from Loss Measurements," *IEEE Journal of Lightwave Technology*, vol. LT–3, No. 4, pp. 864–867 (1985).

Pan, Ru–Pin et al., "Voltage–Controlled Optical Fiber Coupler Using a Layer a Low–Refractive–Index Liquid Crystal with Positive Dielectric Anisotrophy," *Jpn. J. Appl. Phys.*, vol. 34, Part 1, No. 12A, pp. 6410–6415 (Dec. 1995).

Parriaux, O. et al., "Distributed Coupling on Polished Single–Mode Optical Fibers, " *Applied Optics* 20, pp. 2420–2423 (1981).

Digonnet et al., "Measurement of the Core Proximity in Polished Fiber Substrates and Couplers," *Optics Letters*, vol. 10, No. 9, pp. 463–465, Sep. 1985.

* cited by examiner

US 6,301,426 B1

MECHANICALLY ADJUSTABLE FIBER OPTIC ATTENUATOR AND METHOD EMPLOYING SAME

TECHNICAL FIELD

The present invention relates to adjustable attenuators and adjustable attenuation systems for attenuating optical energy transmitted through a fiber optic.

BACKGROUND OF THE INVENTION

There is often a requirement in fiber optic system design for precise control of the optical signal levels entering various system components. This is particularly true when a deployed fiber optic system requires tailoring for optimum performance as a final stage. An adjustable attenuator, which is set at a desired level of attenuation and remains stable with time, temperature, etc. is an important part of this tailoring stage.

The majority of fiber optic adjustable attenuator devices currently commercially available rely on controlled air gaps between polished fibers. The attenuation level is adjusted by mechanically separating the fiber ends, and reducing the fraction of light captured by the pick-up fiber. Certain steps must be taken to provide acceptable levels of back-reflected light and avoid in-line etalon affects due to reflections from the polished fiber ends. Often this requires anti-reflection coatings or angle-polishing of the fiber ends that add to the cost and fabrication complexity of the device.

Therefore, there is a need for a fiber optic adjustable attenuator device architecture that keeps the optical fiber core intact and adjusts attenuation by selectively inserting a glass preform of desired dimensions and refractive index into an evanescent field of, e.g., a side-polished fiber.

SUMMARY OF THE INVENTION

The shortcomings of the prior approaches are overcome, and additional advantages are provided, by the present invention, which in one aspect relates to an attenuator for attenuating optical energy transmitted through a portion of a fiber optic. The portion of the fiber optic has an exposed side surface through which at least some of the optical energy can be adjustably extracted. A refractive index medium preform is selectively engageable with the exposed surface for adjustably extracting the optical energy.

In another aspect of the present invention, the preform adjustably extracts optical energy in response to an adjustable force applied to the preform. For example, an actuator may be operably attached for selectively engaging the preform with the exposed surface. Desirably, the actuator is responsive to an output of the attenuator.

In another aspect of the present invention the preform may include a curve-shaped surface, e.g., cylindrical-shaped surface, tangentially engageable with the exposed surface. Desirably, the attenuator includes an actuator for selectively rocking the preform to vary the engagement between the preform and the exposed surface. Advantageously, the actuator may include an elongated flexible beam attached to the preform so that the elongated beam has a first portion which extends from the preform and a second portion which extends from the preform, and a first set screw and a second set screw for engaging the first portion and the second portion of the beam, respectively.

In another aspect of the present invention, a method for attenuating optical energy transmitted in a fiber optic includes the steps of providing a portion of the fiber optic through which the optical energy is transmitted, having an exposed side surface through which at least some of the optical energy can be controllably extracted, and selectively engaging a refractive index medium preform with the exposed surface to adjustably extract the optical energy.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiments and the accompanying drawings in which:

DETAILED DESCRIPTION OF THE PREFERRED EMBODIMENTS

Figure 1:
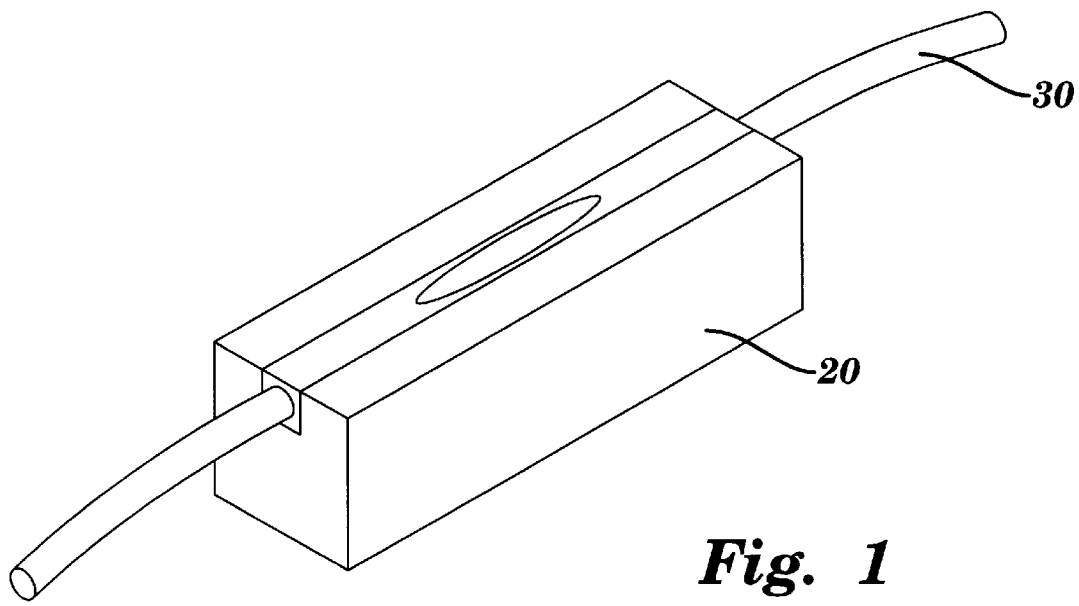
FIG. 1 is a perspective view of a side-polished fiber optic assembly showing an exposed surface of the fiber optic.

With reference to FIG. 1, a single-mode optical fiber 30 (e.g. standard telecommunications Corning SMF-28) which is side-polished close to its core, allows the evanescent tail of the fiber mode field to be exposed. Typically, the remaining cladding thickness is <5 $\mu$m. Significant power can be tapped from the fiber core by application of an external medium to the polished surface of the fiber cladding. The external medium must have a refractive index greater than or approximately equal to that of the fiber mode effective index. This value is dependent upon the fiber core and cladding indices and the fiber core dimensions but always lies between the core and cladding indices. Maximum power is lost from the fiber when the external medium matches the fiber mode effective index.

A standard single-mode fiber has an 8.3 $\mu$m diameter core region of slightly raised refractive index surrounded by a 125±1 $\mu$m fused silica cladding. The fused silica cladding forms the cladding. The mode field diameter is 9.3 ±0.5 $\mu$m at 1310 nm and 10.5 ±0.5 $\mu$m at 1550 nm. The refractive index values supplied by Corning for SMF-28 fiber are:

$\lambda$=1300 nm, $n_{core}$ =1.4541, $n_{clad}$ =1.4483

$\lambda$=1550 nm, $n_{core}$ =1.4505, $n_{clad}$ =1.4447

The low core-cladding refractive index combined with the small core size results in single-mode propagation of light with wavelengths above 1190 nm. Therefore, the fiber can be used in both spectral regions although it was designed for 1310 nm operation where dispersion (combination of material and waveguide dispersion) is minimized and attenuation is low (<0.4 dB/km).

The side-polished fiber ("SPF") assembly architecture (shown in FIG. 1) may be fabricated using standard lapping and polishing techniques. Fiber 30 is embedded in a fused silica substrate block 20 containing a controlled radius of curvature groove. Material is carefully removed from the fiber cladding until the core is approached. At this point, the evanescent field of the mode of the optical fiber can be accessed. The device interaction length is controlled by the remaining cladding thickness and fiber radius of curvature (groove radius).

Figure 2:
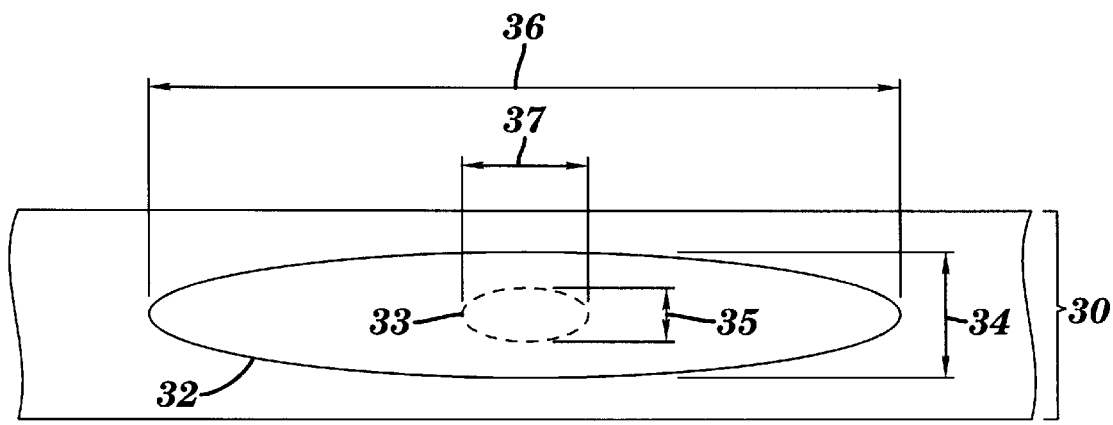
FIG. 2 is a top view of a side-polished fiber optic assembly shown in FIG. 1 illustrating the exposed surface and an exemplary evanescent optical interaction surface.

With reference to FIG. 2, a portion of fiber optic 30 is shown in greater detail. Fiber optic 30, for example, is polished into its cladding, approaching the core, thereby exposing a surface 32 having, in one example, a width 34 dimension of 100 μm, and a length 36 dimension of 7–10 mm. Though the cladding is polished to surface 32, the actual evanescent optical interaction area or surface 33 is much smaller, i.e., having a width 35 of 10 μm and a length 37 of 2 mm.

Once the fiber core has been approached via the polishing process, a multiple liquid-drop procedure can be performed to characterize the SPF in terms of its refractive index response, e.g., as disclosed in Digonnet, M. J. F., Feth, J. R., Stokes, L. F., Measurement of the Core Proximity in Fiber Substrates and Couplers, Optics Letters, Vol. 10, No. 9, September 1985, the subject matter of which is incorporated herein by reference thereto.

This procedure involves placing a series of liquids, e.g., oils, of known refractive indices onto the polished surface of the fiber. It has the advantage that the interface between the oil and the SPF is always as good as the SPF surface and there is no need to treat the SPF/oil interface in any special way. This procedure compares the optical transmission (attenuation) of the SPF with (i) air superstrate and (ii) known refractive index liquid superstrate. In the presence of an air superstrate, zero attenuation occurs. The transmission (attenuation) properties of a SPF are dependent upon the penetration (thus remaining cladding thickness) of the fiber evanescent field into whichever material is placed on the SPF surface and also on the radius of curvature of the fiber. The presence of the liquid causes optical power to be coupled out of the SPF and lost. Thus, the SPF transmission is attenuated.

Figure 3:
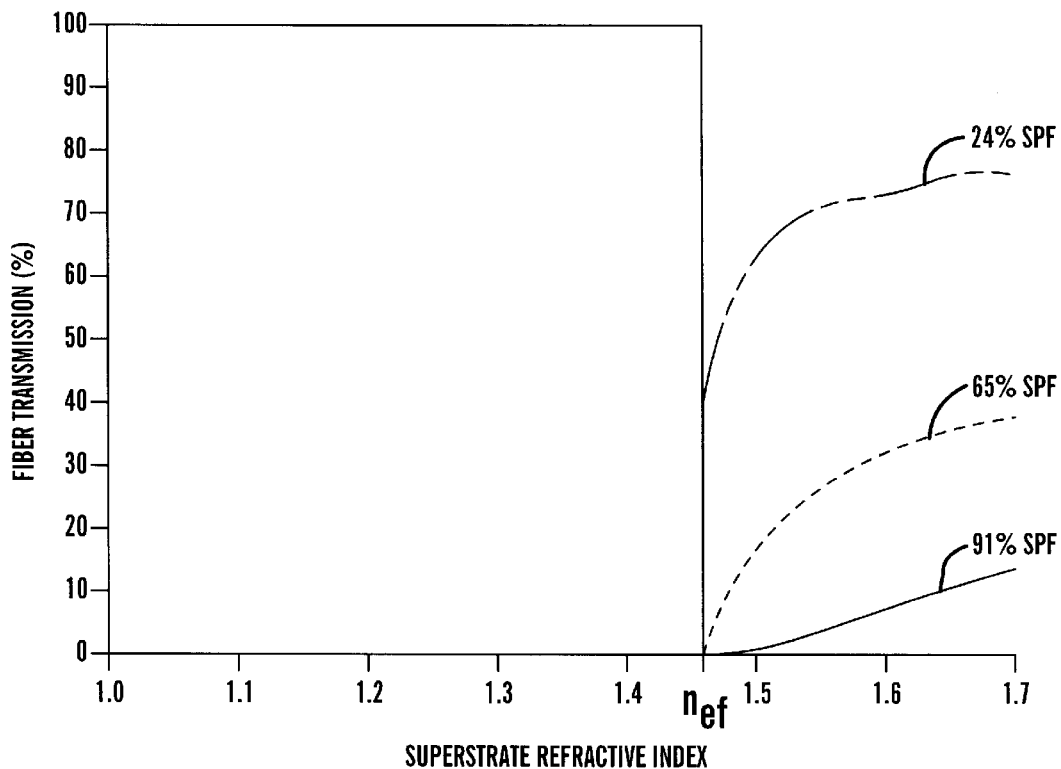
FIG. 3 is a graph depicting, in percentage, the attenuation verses refractive index response of three side-polished fibers which have different remaining cladding thicknesses.
Figure 4:
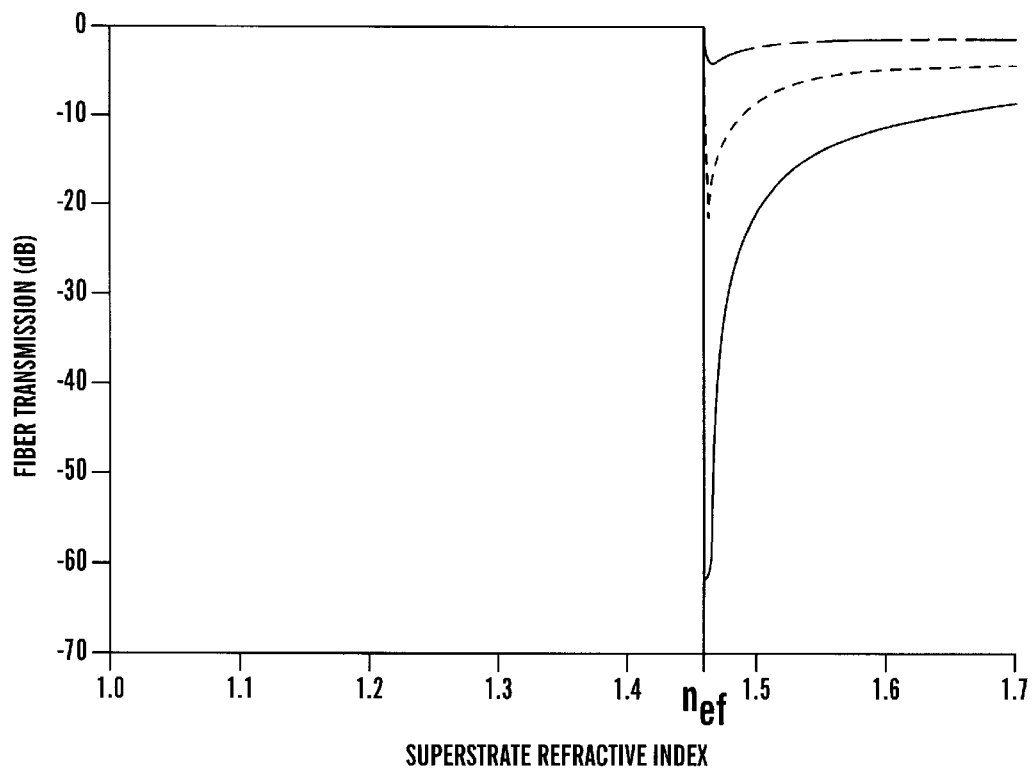
FIG. 4 is a graph depicting, in decibels, the attenuation verses refractive index response of three side-polished fibers which have different remaining cladding thicknesses.

FIGS. 3 and 4 illustrate the attenuation (percentages and decibels, respectively) versus refractive index response of three SPFs which have different remaining cladding thicknesses. At indices below the fiber mode effective index ($n_{ef}$), no optical power is removed from the fiber. Close to $n_{ef}$, the transmission response drops sharply and strong extinction is observed. Above $n_{ef}$, the fiber attenuation reduces gradually to a set level of attenuation.

According to the present invention, a solid preform of selected refractive index medium is to carefully brought into and out of engagement, e.g., physical contact with the SPF surface, thereby varying the material's physical contact with the interaction region or evanescent optical interaction surface of the SPF. Desirably, a refractive index medium preform having a curved-shaped surface is tangentially engageable, e.g., contactable, with the exposed surface of the fiber optic.

Figure 5:
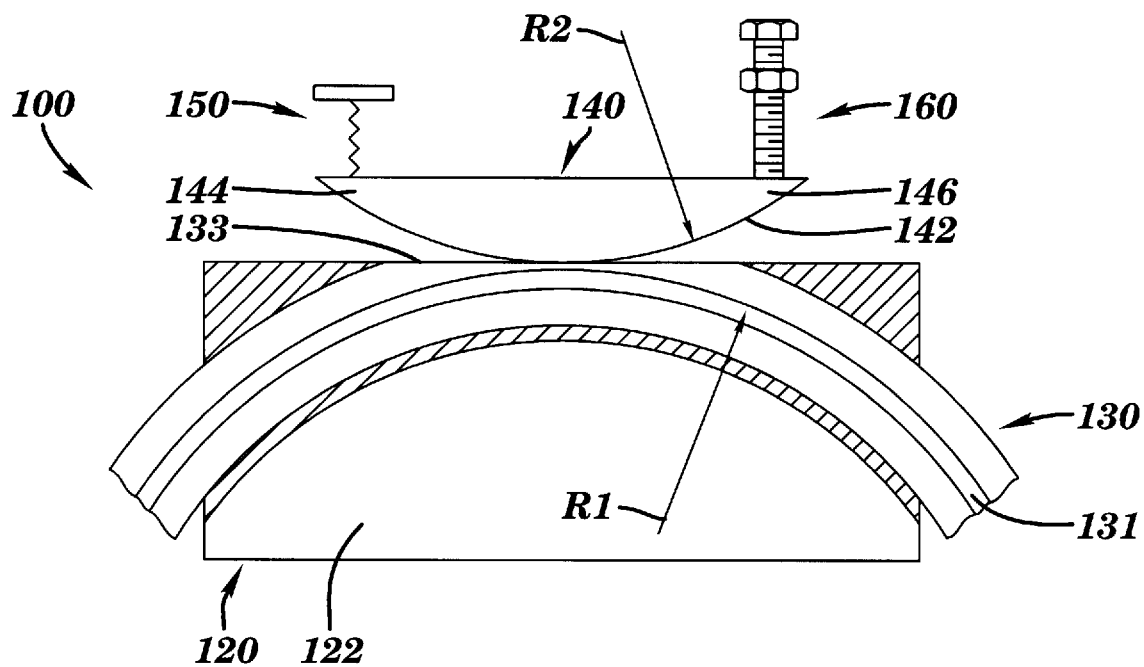
FIG. 5 is a side elevational view, in part cross-section, of a controllable fiber optic attenuator in accordance with the present invention.

FIG. 5 illustrates a first exemplary embodiment of an attenuator 100 in accordance with the present invention for attenuating optical energy transmitted in a fiber optic 130. Attenuator 100 includes a side-polished fiber assembly 120 comprising a silica substrate bock 122 and fiber optic 130 having a core 131, and a curved-shaped, e.g., cylindrical-shaped, preform 140 having a surface 142 comprising a portion of a circular cylinder. In this exemplary embodiment, preform 140 is positioned to "rock" or "roll" across the evanescent optical interaction surface 133 and along the length thereof. Such a configuration for preform 140 provides a tangential surface contact with the side-polished device in which the position of tangential surface contact may be selectively varied by "rocking" preform 140.

As explained above, the attenuator is formed with respect to a portion of the fiber optic having material removed therefrom, thereby exposing a surface thereof, through which optical energy can be controllably extracted. By maintaining the integrity of the fiber optic within this attenuator, unnecessary losses due to interruption of the fiber can be controlled. In one exemplary embodiment, the attenuator is 1.5 inches in length, about 0.5 inches in wide, and about 0.5 in depth. Therefore, the attenuator of the present invention can be implemented in a relatively small package suitable for many types of system and/or field uses.

With reference still to FIG. 5, preform 140 is rocked or rolled along the SPF interaction length under mechanical pressure. The mechanical pressure minimizes any air gap at the contact point between the SPF and the preform and attenuation occurs over the length of the contact area. In this exemplary embodiment, the contact area is dependent on the SPF radius of curvature R1, and the preform radius of curvature R2. Attenuation effect of attenuator 100 is affected by, for example, the SPF radius of curvature, the radius of curvature of the preform, the pressure between the SPF and the preform, the index of refraction of the SPF and the index of refraction of the preform, and the coupling strength of the fiber.

From the present description, it will be appreciated by those skilled in the art that the preform may have a elliptical-shaped surface or other suitable curved-shaped surface which provides a tangential surface contact with the SPF. It is also appreciated that the surface of the preform may be symmetrical or non-symmetrical.

The rocking and positioning of preform 140 relative to evanescent optical interaction surface 133 may be effected by, e.g., a spring 150, disposed on and attached to a first portion 144 of preform 140 to apply a force to bias first portion 144 towards side-polished fiber device 120, and, e.g., a threaded screw or set screw 160 which engages a second portion 146 of preform 140. In this exemplary embodiment, attenuator 100 may be readily set and maintained at specific level of attenuation.

For low polarization sensitivity and maximum attenuation dynamic range, the preform may be fabricated from a material with a refractive index just slightly greater than the fiber mode. Fine adjustment resolution can be expected from this architecture but dynamic range may be limited. Desirably, the design of the attenuator of the present invention avoids epoxies so associated problems are removed. Thermal sensitivity can be minimized by material selection, i.e., material having low thermal expansion, and design, i.e., mechanical fixturing.

Figure 6:
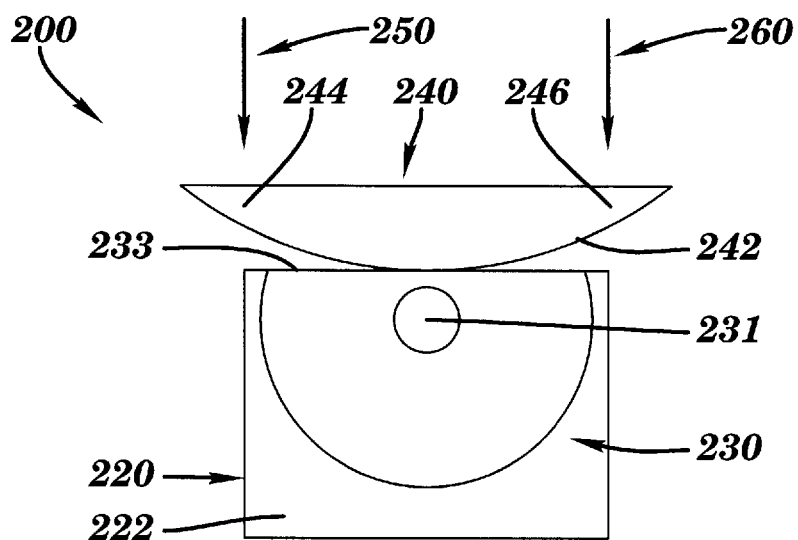
FIG. 6 is an end view, in part cross-section, of an alternative embodiment of a controllable fiber optic attenuator in accordance with the present invention.

FIG. 6 illustrates an alternative embodiment of an attenuator 200 in accordance with the present invention for attenuating optical energy transmitted in a fiber optic 230. This illustrated embodiment, is similar to the attenuator shown in FIG. 5, but instead uses a transverse motion of a curved-shaped, e.g., cylindrical-shaped, preform 240 having a surface 242 comprising a portion of a circular cylinder. For example, attenuator 200 includes a side-polished fiber assembly 220 comprising a silica substrate bock 222 and fiber optic 230 having a core 231, and preform 240. In this exemplary embodiment, cylindrical preform 240 is positioned in a transversely extending direction, i.e., so as to rock or roll across the surface and along the width of an evanescent optical interaction surface 233 of fiber optic 230.

The rocking and positioning of preform 140 relative to evanescent optical interaction surface 233 may be effected by, e.g., a spring 250 disposed on and attached to a first portion 244 of preform 240 to apply a force to bias first portion 244 towards side-polished fiber device 220, and, e.g., a threaded screw, or set screw 260 which engages a second portion 246 of preform 240. In this exemplary embodiment, attenuator 200 may be readily set and maintained at specific level of attenuation.

Attenuator 200 provides a more sensitive alternative geometry which can provide large attenuation dynamic range with low polarization sensitivity and low back-reflection.

Figure 7A:
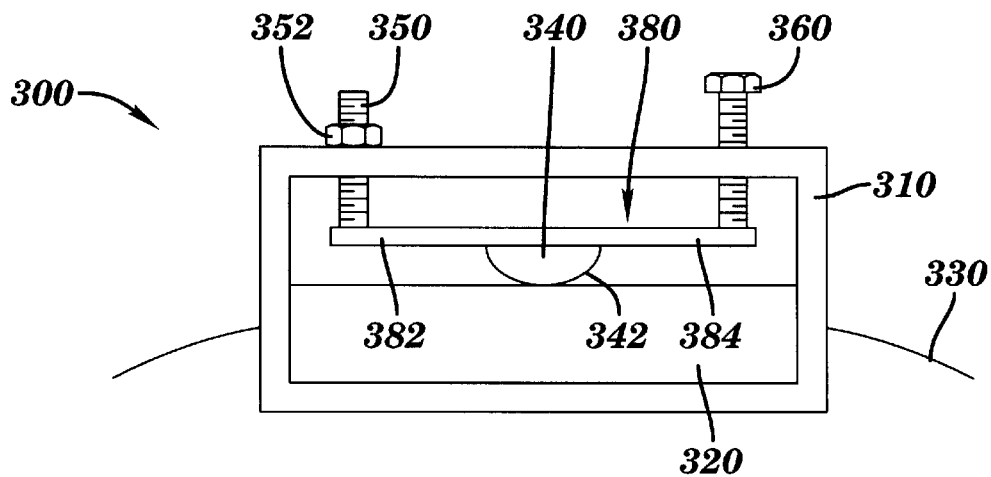
FIGS. 7A–7C are side elevational views, in part cross-section, of an alternative embodiment of a controllable fiber optic attenuator in accordance with the present invention.
Figure 7B:
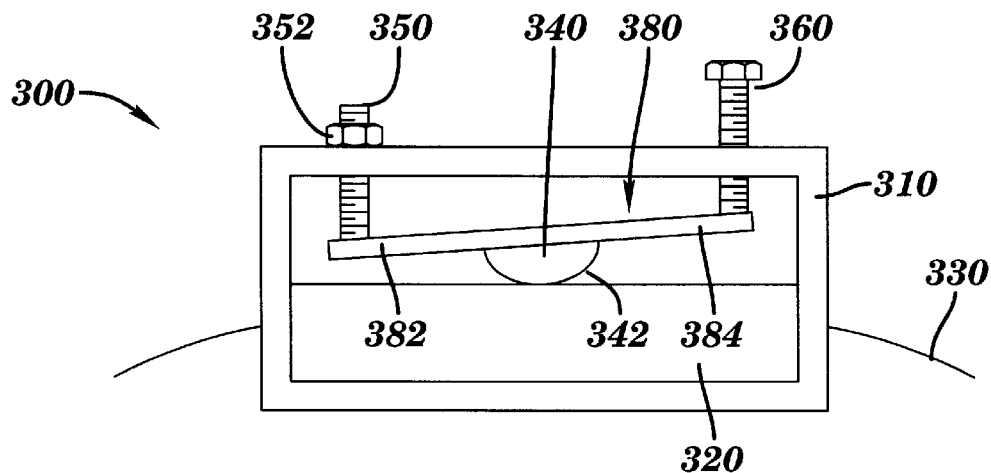
Figure 7C:
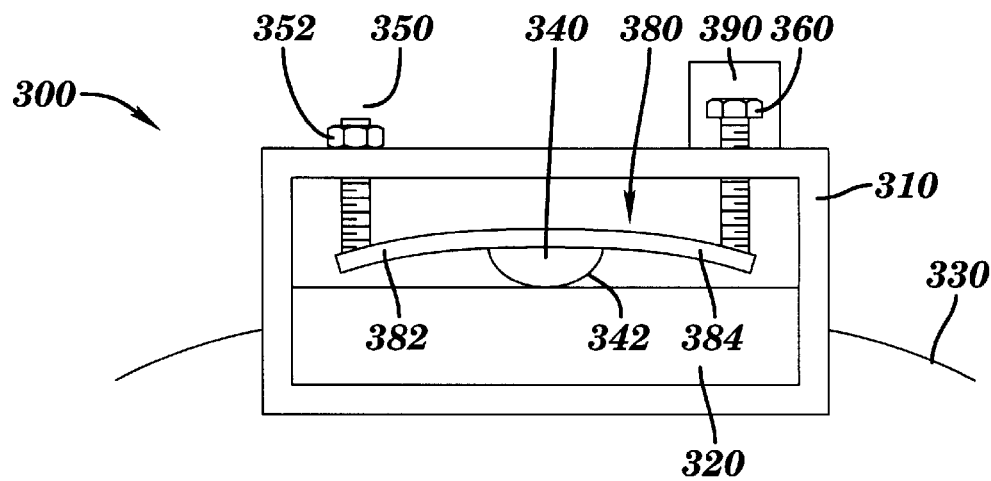

FIGS. 7A–7C illustrate an alternative embodiment of an attenuator 300 in accordance with the present invention for attenuating optical energy transmitted in a fiber optic 330. Attenuator 300 comprises a housing 310, e.g., fabricated from aluminum, in which is contained a side-polished fiber assembly 320 comprising a cured glass-epoxy composite (e.g., G-10) material and fiber optic 330 having a core, and a curved-shaped, e.g., cylindrical-shaped preform 340 having a surface 342 comprising a portion of a circular cylinder and an opposite generally flat surface which is attached to a flexible beam 380. In this exemplary embodiment, preform 340 is positioned to "rock" or "roll" across the evanescent optical interaction surface and along the length thereof.

The rocking and positioning of preform 340 relative to an evanescent optical interaction surface of side-polished fiber assembly 320 may be effected by a set screw 350 which extends through housing 310 and engages a first portion 382 of beam 380. Set screw 350 provides a stop for positioning a first portion 382 of preform 340 relative to side-polished fiber assembly 320. Desirably, a locking nut 352 locks set screw 350 in a fixed position relative to housing 310. An adjustable screw 360 extends through housing 310 and engages a second portion 384 of beam 380. By providing a flexible beam, the adjustment of set screw 350 and adjustable screw 360 are less sensitive for adjusting the attenuators compared to the attenuators shown in FIGS. 5 and 6.

In operation, to set attenuator 300 at specific level of attenuation, adjustable screw 360 is backed off and set screw 350 is rotated to cause beam 380 to be disposed on an angle relative to side-polished assembly 320 as shown in FIG. 7B. Adjustable screw 360 is then rotated to cause preform 340 to rotate and desirably be positioned in the middle region of the evanescent field of side-polished fiber assembly 320 as shown in FIG. 7C. Positioning perform 340 in the middle region of the evanescent field provides effective attenuation or extraction of light, e.g., up to 50 dB. Desirably, by backing off adjustable screw 360, perform 340 will roll or rotate away from the middle region of evanescent field of side-polished fiber assembly 320 so that the attenuation or extraction of light will be reduced. Desirably, attenuator 300 provides attenuation from about 0 dB to about 30 dB (essentially no transmission of light through the fiber optic at 30 dB), and preferably from about 0 dB to about 50 dB.

As shown in FIG. 7C, an actuator 390 may be operably connected to automatically position adjustable screw 360.

For example, actuator 390 may include an electric stepper motor. From the present description, it will be appreciated by those skilled in the art that an electric motor, a pneumatic actuator, a hydraulic actuator, or other suitable mechanism may be operably connected to selectively position second end portion 384 of beam 380 to cause the cylindrical preform to move, e.g., roll, relative to side-polished fiber assembly 320.

Figure 8:
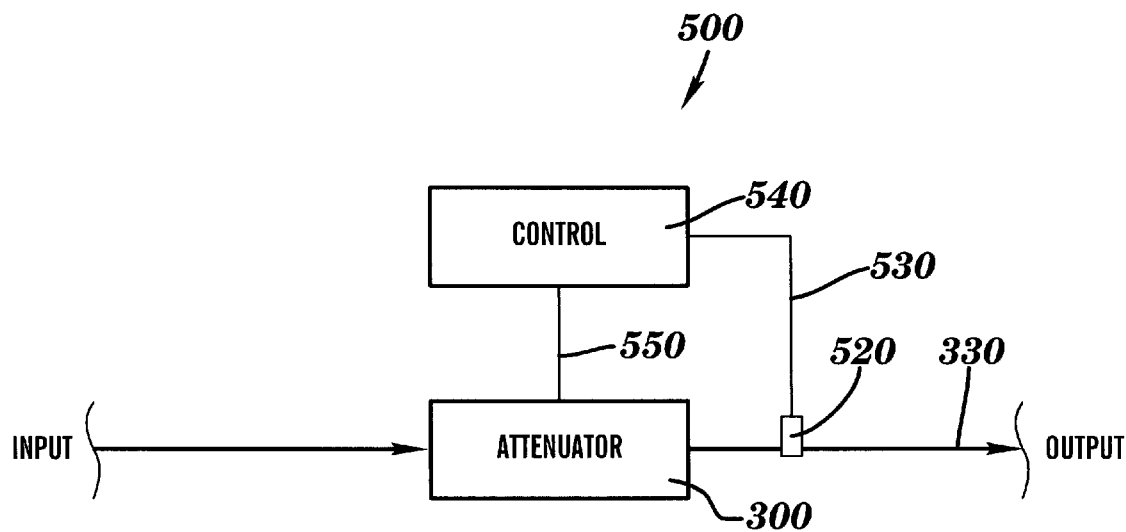
FIG. 8 is a system within which the attenuator of FIG. 7 can be employed.

FIG. 8 illustrates an exemplary system 500 in accordance with the present invention for automatically adjustably attenuating optical energy transmitted in a fiber optic 330. In this exemplary embodiment, a splitter/sensor 520 provides a signal responsive to the output from attenuator 300 which is fed via a wire 530 to a control circuit 540. In response to the signal from splitter/sensor 520, control circuit 540 can control via wire 550 electric stepper motor 390 (FIG. 7C). From the present description, it will be appreciated by those skilled in the art that the attenuator can be remotely controlled and/or other suitable sensors may be operably connected for automatically adjusting the position of the preform in the attenuator.

Cylindrical preforms may be fabricated from glass and may include germanium-doped fused silica, FK3 and FK5 (both supplied by Schott Glass, Inc.). Desirably, each of these glasses has a refractive index, at 1330 nm and 1550 nm, which is close to the most sensitive region of the SPF attenuation curves shown in FIGS. 3 and 4. The doped silica is particularly attractive since it matches the refractive index wavelength dispersion of the single-mode fiber and thus offers the possibility of broadband operation in a wavelength division multiplexer ("WDM") system. Advantageously, a preform with refractive index close to that of the fiber mode index will result in optimum performance in terms of attenuation dynamic range and polarization response.

In summary, this present invention relates to mechanically moving a material into and out of the exposed evanescent field to effect a mechanically adjustable level of attenuation. Adjustable attenuation is achieved by inserting a controlled refractive index glass "preform" into the exposed, evanescent field of a side-polished fiber, e.g., rocking a carefully selected glass preform across and in contact with the interaction region of an SPF. Desirably, the glass preform has been shaped to provide a sufficient interaction length while avoiding the problems associated with control of a residual air gap between the SPF and a bulk glass overlay. The present invention may be readily configured to provide a single-mode fiber optic adjustable attenuator designed to operate in the useful telecommunications spectral windows around 1300 nm and 1550 nm. The device can be placed in a fiber optic network or system by simple fusion splicing or connectorization to attenuate the optical signal level by a desired amount.

Experimental results indicate that >35 dB attenuation dynamic range is achievable, depending on coupling strength. Using available SPF blocks with 90% coupling strength at $\lambda$=1550 nm, up to 50dB attenuation has been observed for moderate to high pressure application of a FK3 preform. Using lower coupling strength SPF blocks results in reduced dynamic range attenuation.

Table I shows performance figures for a sample of devices (SPF blocks) tested. For example, the FK3 preforms had a radius of curvature of 25 cm, so interaction length was fairly large. The attenuation tests were performed at $\lambda$=1550 nm.

| SPF Block | Attenuation Dynamic Range (dB) | PDL at Max. Attenuation (dB) | Coupling Strength (%) |
|---|---|---|---|
| 1 | 35 | 1 | 89 |
| 2 | 48 | 1 | 91 |
| 3 | 27 | 1 | 89 |
| 4 | 34 | 0.3 | 90 |
| 5 | 45 | 3 | 89 |

The results of the above-noted test indicate that significant variation in attenuation dynamic range can occur even though the SPF coupling strength is nominally the same. This may be due to the location of the fiber in the groove or be related to the alignment of the FK3 preform to the surface of the SPF block. The polarization dependent losses ("PDL") values show less variation and are not too far from normal specifications. An adjustment resolution of <0.5dB was generally achievable.

A sample SPF was fabricated on a modified BK7 lens using Epotek 353ND as the bonding agent. The lens section was cut to give a footprint of approximately 5 mm width by 30 mm length, with the highest point of the radius located centrally. This resulted in a SPF platform similar in dimensions to standard SPF blocks. Processing was performed in the normal manner for standard variable attenuators. A coupling strength of 88% at $\lambda$=1550 nm was selected since this was around the normal value. The fiber was 900 $\mu$m buffered and pre-ferrulized. The device was assembled into a housing and adjustments made via spring-loaded screws (e.g., plungers). A maximum attenuation of >45dB was easily achieved (i.e., with low pressure) while PDL was <1dB. The polarization response of the SPF was minimal.

Figure 9:
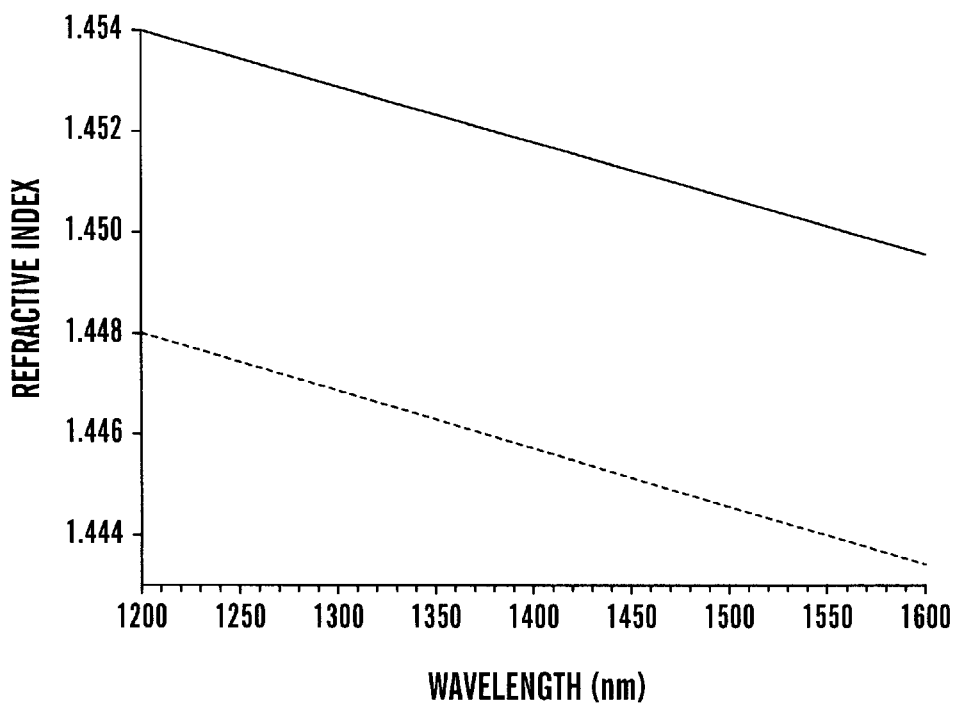
FIG. 9 is a graph of refractive index verses wavelength response for two side-polished fibers.

Experimental results indicate that the attenuation is relatively flat across the 1530–1560 nm band as shown in FIG. 9. This is expected since the FK3 dispersion is very similar to that of fused silica and, therefore, that of the doped fiber core. In addition, attenuation difference of <1dB over 50 nm in the 1300 nm spectral region has been observed.

The choice of epoxy to secure the fiber to the radial surface should be reasonably hard so that the pressure applied by the preform is reduced and the mechanical stress imparted to the fiber is minimized. A suitable epoxy is Epotek 353ND. In addition, the block forming the side polished fiber assembly may be formed of fused silica, a glass-epoxy composite, as well as other suitable materials. It is also appreciated that other suitable design or configurations for the block may be suitably employed.

While the invention has been particularly shown and described with reference to preferred embodiments thereof, it will be understood by those skilled in the art that various changes in form and details may be made therein without departing from the spirit and scope of the invention.

What is claimed is:

1. An attenuator for attenuating optical energy, comprising:
    an unbroken portion of a fiber optic through which the optical energy is transmitted, said portion having a side surface through which at least some of the optical energy is adjustably extracted; and
    a refractive index medium preform having respective surface portions thereof selectively engageable along a length of the side surface for adjustably extracting the optical energy.

2. The attenuator of claim 1, wherein the preform adjustably extracts optical energy in response to an adjustable force applied to the preform which varies the engagement between the preform and the side surface.

3. The attenuator of claim 1, further comprising an actuator for selectively engaging the preform with the side surface.

4. The attenuator of claim 3, wherein the actuator is responsive to an output of the attenuator.

5. The attenuator of claim 3, wherein the actuator comprises an electric motor.

6. The attenuator of claim 1, wherein the preform comprises a curve-shaped surface tangentially engageable with the side surface.

7. The attenuator of claim 6, wherein the side surface comprises a length and a width, and the curved-shaped surface extends across substantially the length of the side surface.

8. The attenuator of claim 6, wherein the side surface comprises a length and a width, and the curved-shaped surface extends across substantially the width of the side surface.

9. The attenuator of claim 1, wherein the preform comprises a cylindrical-shaped surface tangentially engageable with the side surface.

10. The attenuator of claim 1, wherein the preform comprises a curved-shaped surface tangentially engageable with the side surface, and further comprising an actuator for selectively rocking the preform to vary the engagement between the preform and the side surface.

11. The attenuator of claim 1, wherein the preform comprises an index of refraction substantially equal to the index of refraction of the optic fiber.

12. The attenuator of claim 1, wherein the preform comprises a material selected from the group consisting of glass, fused silica, and germanium-doped fused silica.

13. An attenuator for attenuating optical energy, comprising:
    a portion of a fiber optic through which the optical energy is transmitted, having a side surface through which at least some of the optical energy is adjustably extracted; and
    a refractive index medium preform selectively engageable with the side surface for adjustably extracting the optical energy;
    wherein the preform comprises a curved-shaped surface tangentially engageable with the side surface, and further comprising an actuator for selectively rocking the preform to vary the engagement between the preform and the side surface; and
    wherein the actuator comprises an elongated flexible beam attached to the preform, the elongated beam having a first portion which extends from the preform and a second portion which extends from the preform.

14. The attenuator of claim 11, wherein the actuator comprises a first set screw and a second set screw for engaging the first portion and the second portion of the beam, respectively.

15. An attenuator for attenuating optical energy, comprising:
    a portion of a fiber optic through which the optical energy is transmitted, having a side surface through which at least some of the optical energy is adjustably extracted;
    a refraction index medium preform selectively engageable with the side surface for adjustably extracting the optical energy, the preform comprising a first curved-shaped surface tangentially engageable with the side surface;

a flexible beam attached to the preform, the flexible beam having a first portion which extends from the preform and a second portion which extends from the preform; and a first set screw and a second set screw for engaging the first portion and the second portion of the beam, respectively.

16. A method for attenuating optical energy transmitted in a fiber optic, comprising:

providing an unbroken portion of the fiber optic through which the optical energy is transmitted, having a side surface through which at least some of the optical energy is adjustably extracted; and selectively engaging respective surface portions of a refractive index medium preform along a length of the side surface to adjustably extract the optical energy.

17. The method of claim 16, wherein the selectively engaging comprises applying a force to the preform to vary the engagement between the preform and the side surface.

18. The method of claim 16, wherein the selectively engaging is responsive to an output of the attenuator.

19. The method of claim 16, wherein the preform comprises a curve-shaped surface tangentially engageable with the side surface.

20. The method of claim 16, wherein the preform comprises a cylindrical-shaped surface tangentially engageable with the side surface.

21. The method of claim 16, wherein the selectively engaging comprises selectively rocking the preform having a curved-shaped surface to vary the engagement between the preform and the side surface.

22. The method of claim 16, wherein the preform comprises an index of refraction substantially equal to the index of refraction of the optic fiber.

23. The method of claim 16, wherein the preform comprises a material selected from the group consisting of glass, fused silica, and germanium-doped fused silica.

24. A method for fabricating an attenuator for attenuating optical energy, the method comprising:

providing an unbroken fiber optic portion having a side surface through which at least some of the optical energy is adjustably extracted;

providing a refractive index medium preform; and positioning the preform adjacent the side surface for selective engagement of respective surface portions thereof with the side surface through which at least some of the optical energy is adjustably extracted.

25. The method of claim 24, further comprising polishing the side of the fiber optic.

26. The method of claim 24, further comprising providing an actuator for selectively engaging the preform with the side surface.

27. The method of claim 26, further comprising providing a controller for controlling the actuator to selectively engage the preform with the side surface in response to an output of the attenuator.

28. The method of claim 26, wherein the actuator comprises an electric motor.

29. The method of claim 24, further comprising providing means for selectively engaging the preform with the side surface.

30. The method of claim 24, further comprising providing a curve-shaped surface on the preform.

31. The method of claim 24, further comprising positioning the preform to tangentially engage the side surface.

32. The method of claim 31, further comprising providing an actuator for selectively rocking the preform to vary the engagement between the preform and the side surface.

33. The method of claim 24, wherein the preform comprises an index of refraction substantially equal to the index of refraction of the optic fiber.

34. The method of claim 24, wherein the preform comprises a material selected from the group consisting of glass, fused silica, and germanium-doped fused silica.

35. A method for fabricating an attenuator for attenuating optical energy, the method comprising:

providing a fiber optic having a side surface;

providing a refractive index medium preform;

positioning the preform adjacent the side surface for selective engagement with the side surface through which at least some of the optical energy is adjustably extracted; and providing an elongated flexible beam, and attaching the elongated beam to the preform.

36. The method of claim 35, further comprising providing a first set screw and a second set screw for engaging a first portion and a second portion of the beam, respectively, for varying the engagement between the preform and the side surface.

* * * * *